United States Patent
Jang et al.

(10) Patent No.: US 11,886,490 B2
(45) Date of Patent: Jan. 30, 2024

(54) NEURAL NETWORK DEVICE FOR RETRIEVING IMAGE AND OPERATING METHOD THEREOF

(71) Applicant: SAMSUNG ELECTRONICS CO., LTD., Suwon-si (KR)

(72) Inventors: Youngkyun Jang, Seoul (KR); Namik Cho, Seoul (KR)

(73) Assignees: SAMSUNG ELECTRONICS CO, LTD., Suwon-si (KR); SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 317 days.

(21) Appl. No.: 17/222,266

(22) Filed: Apr. 5, 2021

(65) Prior Publication Data

US 2021/0312234 A1    Oct. 7, 2021

(30) Foreign Application Priority Data

Apr. 3, 2020 (KR) .................. 10-2020-0041076
Feb. 4, 2021 (KR) .................. 10-2021-0016274

(51) Int. Cl.
*G06F 16/55* (2019.01)
*G06N 3/08* (2023.01)
(Continued)

(52) U.S. Cl.
CPC .......... *G06F 16/55* (2019.01); *G06F 18/2148* (2023.01); *G06F 18/24* (2023.01);
(Continued)

(58) Field of Classification Search
CPC ........... G06N 3/04; G06N 3/08; G06V 10/82; G06V 10/764; G06V 10/774; G06V 40/172; G06F 16/55; G06F 18/24; G06F 18/2148
See application file for complete search history.

(56) References Cited

U.S. PATENT DOCUMENTS 8,234,228 B2   7/2012 Weston et al.
8,548,828 B1 * 10/2013 Longmire .............. G16H 40/67
                                                      706/45

(Continued)

FOREIGN PATENT DOCUMENTS

JP    2019528520    10/2019
JP    2020-035039    3/2020

(Continued)

OTHER PUBLICATIONS

Yusuke, et al. (Computer English Translation of Japanese Patent No. JP 2018-97807 A), pp. 1-8. (Year: 2018).*

(Continued)

*Primary Examiner* — Daniel G Mariam
(74) *Attorney, Agent, or Firm* — F. CHAU & ASSOCIATES, LLC (57) ABSTRACT

A neural network device comprises a processor that performs an operation for training a neural network, a feature extraction module that extracts unlabeled feature vectors that correspond to unlabeled images and labeled feature vectors that correspond to labeled images, and a classifier that classifies classes of query images, wherein the processor performs first learning with respect to a plurality of codebooks by using the labeled feature vectors, and performs second learning with respect to the plurality of codebooks by optimizing an entropy based on all of the labeled feature vectors and the unlabeled feature vectors.

19 Claims, 10 Drawing Sheets

(51) Int. Cl.
  *G06N 3/04* (2023.01)
  *G06V 40/16* (2022.01)
  *G06F 18/214* (2023.01)
  *G06F 18/24* (2023.01)
  *G06V 10/764* (2022.01)
  *G06V 10/774* (2022.01)
  *G06V 10/82* (2022.01)

(52) U.S. Cl.
  CPC .............. *G06N 3/04* (2013.01); *G06N 3/08* (2013.01); *G06V 10/764* (2022.01); *G06V 10/774* (2022.01); *G06V 10/82* (2022.01); *G06V 40/172* (2022.01)

(56) References Cited

U.S. PATENT DOCUMENTS

| | | | | |
|---|---|---|---|---|
| 9,792,561 | B2* | 10/2017 | Konoshima | G06F 17/16 |
| 10,902,209 | B2 | 1/2021 | Pienkosz et al. | |
| 11,093,781 | B2* | 8/2021 | Bhat | H04L 51/10 |
| 11,481,603 | B1* | 10/2022 | Newman | G06N 3/042 |
| 2019/0236167 | A1 | 8/2019 | Hu et al. | |
| 2019/0279039 | A1 | 9/2019 | Umeda | |
| 2020/0134375 | A1 | 4/2020 | Zhan et al. | |

FOREIGN PATENT DOCUMENTS

| | | |
|---|---|---|
| KR | 10-0755934 | 8/2007 |
| KR | 10-1902213 | 9/2018 |
| KR | 10-2019-0069136 | 6/2019 |
| KR | 10-2019-0075277 | 7/2019 |
| KR | 10-2019-0094134 | 8/2019 |
| KR | 10-2020-0015611 | 2/2020 |

OTHER PUBLICATIONS

Yaroslav Ganin, et al., "Unsupervised Domain Adaptation by Backpropagation," Proceedings of the 32nd International Conference on Machine Learning, PMLR 37:1180-1189, 2015.

Rongkai Xia, et al., "Supervised Hashing for Image Retrieval via Image Representation Learning," vol. 28 No. 1 (2014): Twenty-Eighth AAAI Conference on Artificial Intelligence, pp. 2156-2162.

Jian Zhang, et al., "SSDH: Semi-Supervised Deep Hashing for Large Scale Image Retrieval," IEEE Transactions on Circuits and Systems for Video Technology ( vol. 29, Issue: 1, Jan. 2017), pp. 212-225.

Hanjiang Lai, et al., "Simultaneous Feature Learning and Hash Coding With Deep Neural Networks," Proceedings of the IEEE Conference on Computer Vision and Pattern Recognition (CVPR), 2015, pp. 3270-3278.

Tan Yu, et al., "Product Quantization Network for Fast Image Retrieval," Proceedings of the European Conference on Computer Vision (ECCV), 2018, pp. 186-201.

Herve Jegou, et al., "Product Quantization for Nearest Neighbor Search," IEEE Transactions on Pattern Analysis and Machine Intelligence ( vol. 33, Issue: 1, Jan. 2011), pp. 117-128.

Kihyuk Sohn, "Improved Deep Metric Learning With Multi-Class N-Pair Loss Objective," Proceedings of the 30th International Conference on Neural Information Processing Systems (NIPS 2016), pp. 1-9.

Qi Li, et al., "Deep Supervised Discrete Hashing," NIPS'17: Proceedings of the 31st International Conference on Neural Information Processing Systems, Dec. 2017 pp. 2479-2488.

\* cited by examiner

|  | CIFAR-10 | | NUS-WIDE | |
|---|---|---|---|---|
|  | 24-bits | 48-bits | 24-bits | 48-bits |
| PROPOSED | 0.869 | 0.883 | 0.865 | 0.878 |
| SSDH [8] | 0.813 | 0.814 | 0.788 | 0.794 |

FIG. 8

NEURAL NETWORK DEVICE FOR RETRIEVING IMAGE AND OPERATING METHOD THEREOF

CROSS-REFERENCE TO RELATED APPLICATIONS

This application claims priority under 35 U.S.C. § 119 from Korean Patent Applications No. 10-2020-0041076, filed on Apr. 3, 2020 in the Korean Intellectual Property Office, and No. 10-2021-0016274, filed on Feb. 4, 2021 in the Korean Intellectual Property Office, the contents of both of which are herein incorporated by reference in their entireties.

TECHNICAL FIELD

Embodiments of the inventive concept are directed to a neural network device and an operating method thereof, and more particularly, to a neural network device for retrieving an image and an operating method thereof.

DISCUSSION OF THE RELATED ART

The use of a binary hash code obtained from a hash function shows extraordinary performance in retrieving images by using a smaller storage space and providing a high retrieval rate. Since the development of deep learning methods, hash functions based on a convolutional neural network have been suggested.

However, hash functions based on the convolutional neural network may not easily obtain desired performance when labeled images in a database are insufficient for retrieving images, and therefore, a method of using unlabeled images with the labeled images is desired.

SUMMARY

Embodiments of the inventive concept provide a neural network that can robustly improve image retrieval performance by using unlabeled images in addition to labeled images, and an operating method thereof.

According to an embodiment of the inventive concept, there is provided a neural network device that includes a processor that performs an operation of training a neural network, a feature extraction module that extracts unlabeled feature vectors that correspond to unlabeled images and labeled feature vectors that correspond to labeled images; and a classifier that classifies classes of a query image, wherein the processor performs first learning with respect to a plurality of codebooks by using the labeled feature vectors, and performs second learning with respect to the plurality of codebooks by optimizing an entropy based on all of the labeled feature vectors and the unlabeled feature vectors.

According to another embodiment of the inventive concept, there is provided an method of operating a neural network, the method including, extracting unlabeled feature vectors that correspond to unlabeled images and labeled feature vectors that correspond to labeled images, performing first learning with respect to a plurality of codebooks by using the labeled feature vectors, and performing second learning with respect to the plurality of codebooks by optimizing an entropy based on all of the labeled feature vectors and the unlabeled feature vectors.

According to another embodiment of the inventive concept, there is provided an method of operating a neural network device, the method including receiving a plurality of biometric images that include at least one labeled image and at least one unlabeled image, extracting feature vectors that correspond to the plurality of biometric images, performing learning with respect to a plurality of codebooks by using the feature vectors, receiving a query image and calculating distance values from the plurality of biometric images, estimating, based on the calculated distance values, expected values for classes that classify the plurality of biometric images; and passing a biometric authentication when a greatest value of the expected values exceeds a preset threshold value.

DETAILED DESCRIPTION

Hereinafter, embodiments of the inventive concept will be described in detail with reference to the accompanying drawings.

Figure 1:
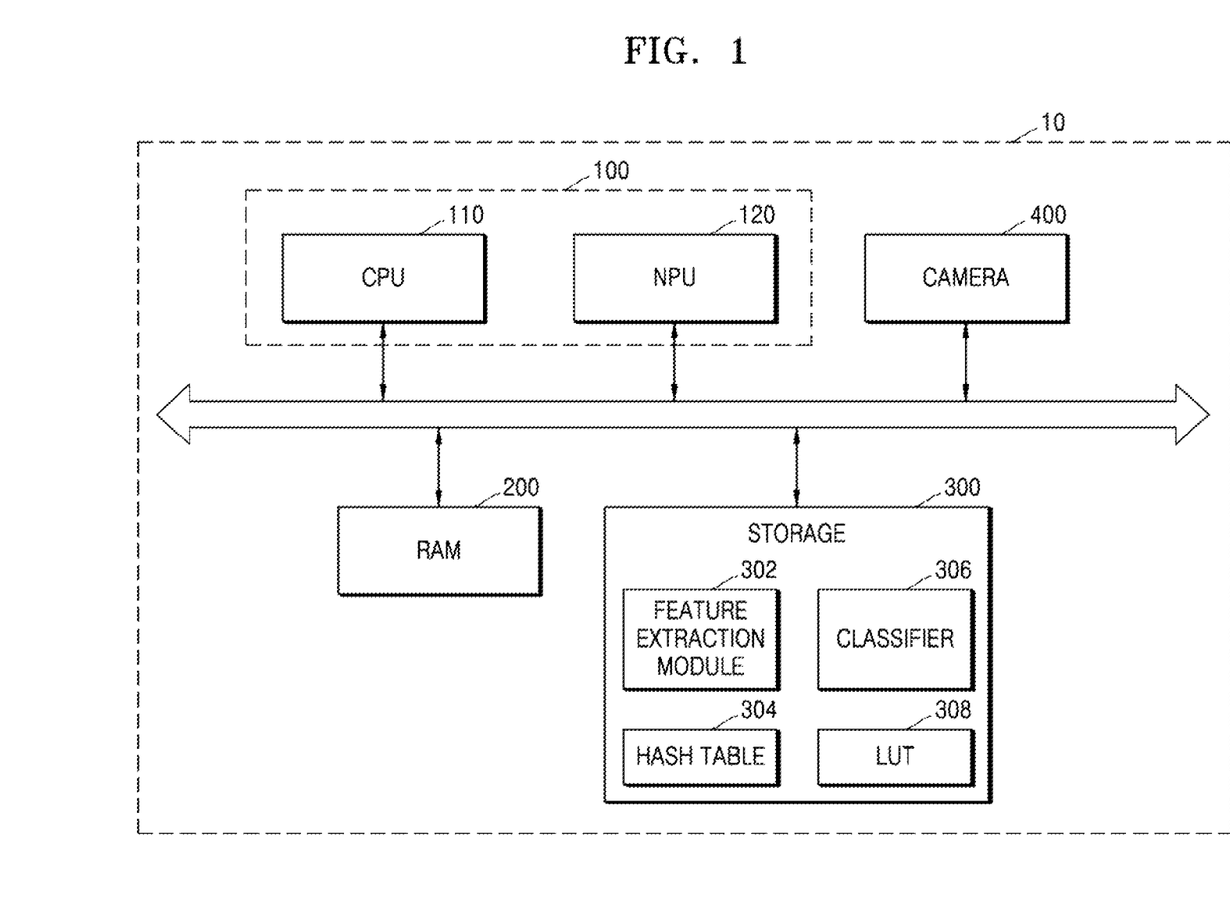
FIG. 1 is a block diagram of a neural network device according to an embodiment of the inventive concept.

FIG. 1 is a block diagram of a neural network device according to an embodiment of the inventive concept.

Referring to FIG. 1, a neural network device 10 according to an embodiment includes a processor 100, random access memory (RAM) 200, a storage 300, and a camera 400.

The neural network device 10 according to an embodiment can analyze input data and extract valid information, and can generate output data based on the extracted information. The input data may be image data that includes various objects, and the output data may be an image retrieval result, such as a classification result of a query image, or an image that is most similar to the query image.

In an embodiment, the image data may include a labeled image and an unlabeled image. The labeled image includes information regarding the classification of an object shown in the image. The unlabeled image does not include information regarding the classification of the object shown in the image.

For example, when the image includes a shape of an animal, such as a cat, a labeled image includes information regarding a class for classifying an object that has the shape shown in the image and that is mapped to the image, such as an animal that has higher class information, and a cat that las lower class information. For example, when the image does not include information regarding a class for classifying an object having the shape shown in the image, the image is an unlabeled image.

According to various embodiments, the neural network device 10 may be implemented as a personal computer (PC), an Internet of Things (IoT) device, or a portable electronic device. The portable electronic device may be included in various devices, such as a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an electronic book (e-book), or a wearable device, etc.

According to various embodiments, the processor 100 controls the neural network device 10. For example, the processor 100 trains the neural network based on a learning image, and performs image retrieval with respect to a query image by using the trained neural network.

According to various embodiments, the processor 100 includes a central processing unit (CPU) 110 and a neural processing unit (NPU) 120. The CPU 110 controls all operations of the neural network device 100. The CPU 110 may be a single core processor or a multi-core processor. The CPU 110 can process or execute programs or data stored in the storage 300. For example, the CPU 110 controls functions of the NPU 120 by executing programs or modules stored in the storage 300.

According to various embodiments, the NPU 120 generates the neural network, trains or learns the neural network, performs operations based on training data and generates an information signal based on a performance result, or retrains the neural network.

According to various embodiments, there are various types of neural network models, such as a convolution neural network (CNN) such as GoogleNet, AlexNet, or VGG Nework, a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a Deconvolution Network, a Deep Belief Network (DBN), a Restricted Boltzman Machine (RBM), a Fully Convolutional Network, a Long Short-Term Memory (LSTM) Network, or a Classification Network, etc., and embodiments are not limited to the above-mentioned models.

According to various embodiments, the NPU 120 also includes an additional memory for storing programs that correspond to neural network models. The NPU 120 further includes additional co-processor blocks that process operations required for driving the neural network. For example, the additional co-processor blocks further include a graphics processing unit (GPU) or an accelerator for rapidly performing certain operations, such as a floating point accelerator.

According to various embodiments, the RAM 200 temporarily stores programs, data, or instructions. For example, the RAM 200 can temporarily load programs or data stored in the storage 300 to control or boot the CPU 110. For example, the RAM 200 may be a dynamic RAM (DRAM), a static RAM (SRAM), or a synchronous DRAM (SDRAM).

According to various embodiments, the storage 300, which stores data, can store an operation system (OS), various programs, and various kinds of data. For example, the storage 300 corresponds to a nonvolatile memory. For example, the storage 300 may be one or more of a read only memory (ROM), A flash memory, a phase-change RAM (PRAM), a magnetic RAM (MRAM), a resistive RAM (RRAM), or a ferroelectric RAM (FRAM), etc. According to an embodiment, the storage 300 may be implemented as a hard disk drive (HDD) or a solid state drive (SSD), etc.

According to various embodiments, the storage 300 stores a feature extraction module 302, a hash table 304, a classifier 306, and a look-up table (LUT) 308. The feature extraction module 302 can generate a feature vector from the image. The classifier 306 can classify the feature vector with a label, and includes information regarding a prototype vector that represents each label. The hash table 304 maps the feature vector obtained from the feature extraction module 302 to a binary hash code. The mapping to the binary hash code includes dividing the feature vector into at least one feature sub vector based on product quantization and replacing each of the at least one feature sub vector with a binary index value that refers to a codeword with a shortest distance of codewords of the hash table 304. The LUT 308 can perform a distance calculation with learned codebooks on the query image and store values therefrom. The LUT 308 is used for classification with respect to a query image.

Figure 2:
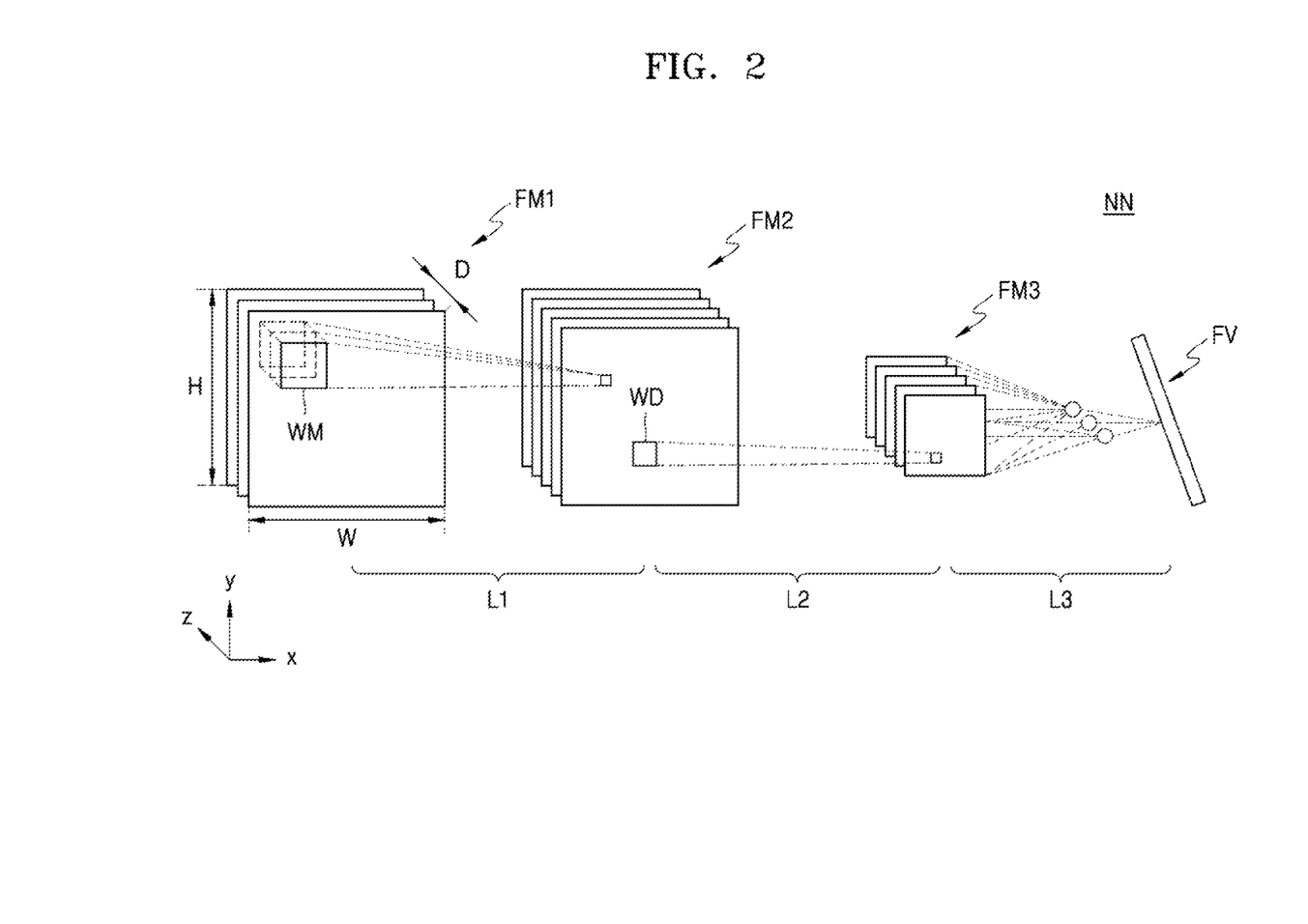
FIG. 2 illustrates the processing of a feature extraction module according to an embodiment.

FIG. 2 illustrates a processing operation of a feature extracting module.

Referring to FIG. 2, according to various embodiments, a neural network NN includes a plurality of layers L1 through Ln. Each of the plurality of layers L1 through Ln may be a linear layer or a non-linear layer, and according to embodiments, at least one linear layer and at least one non-linear layer can be combined with each other and be referred to as a layer. For example, the linear layer may be a convolution layer or a fully-connected layer, and the non-linear layer may be one of a sampling layer, a pooling layer, or an activation layer.

According to an embodiment, a first layer L1 is a convolution layer, and a second layer L2 is a sampling layer. The neural network NN further includes an activation layer, and may further include at least one layer that performs another kind of operation.

According to an embodiment, each of the plurality of layers receives input image data or an input feature map generated from a previous layer, and generates an output feature map by performing an operation on the input feature map. In this case, a feature map is data that represents various characteristics of the input data.

According to an embodiment, feature maps FM1, FM2, and FM3 have, for example, the form of a two-dimensional matrix or a three-dimensional matrix. Each of the feature maps FM1, FM2, and FM3 has a width (or a column), a height (or a row), and a depth, which respectively correspond to the x axis, the y axis, and the z axis in a coordinate system. In this case, the depth may be referred to as the number of channels.

According to an embodiment, the first layer L1 generates the second feature map FM2 by convolving the first feature map FM1 with a weight map WM. The weight map WM filters the first feature map FM1, and may be referred to as a filter or a kernel. A depth of the weight map WM, i.e., the number of channels of the weight map WM, is identical to a depth of the feature map FM1, i.e., the number of channels of the first feature map FM1, and same channels in the weight map WM and the first feature map FM1 are convolved with each other. The weight map WM is shifted by traversing the first feature map FM1 as a sliding window. A shifted amount may be referred to as "a stride length" or "a stride". In each shift, each of weights in the weight map WM is multiplied and added to all feature values in a region that overlaps the first feature map FM1. As the first feature map FM1 and the weight map WM are convolved, a channel of the second feature map FM2 is generated.

Although FIG. 2 shows only one weight map, the weight map WM, substantially, a plurality of weight maps can be convolved with the first feature map FM1, and a plurality of channels of the second feature map FM2 can be generated. In other words, the number of channels of the second feature map FM2 corresponds to the number of weight maps.

According to an embodiment, the second layer L2 generates the third feature map FM3 by changing a spatial size of the second feature map FM2. For example, the second layer L2 is a sampling layer. The second layer L2 performs up-sampling or down-sampling, and selects some of data in the second feature map FM2. For example, a two-dimensional window WD is shifted on the second feature map FM2 in units of the size of the window WD, such as a 4×4 matrix, and a value of a specific position, such as a first row or a first column, is selected in a region that overlaps the window WD. The second layer L2 outputs the selected data as data of the third feature map FM3. In another example, the second layer L2 is a pooling layer. In this case, the second layer L2 selects a max pooling value of feature values or an average pooling value of the feature values in the region that overlaps the window WD in the second feature map FM2. The second layer L2 outputs the selected data as data of the third feature map FM3.

By doing so, according to an embodiment, the third feature map FM3 is generated that has a different spatial size from that of the second feature map FM2. The number of channels of the third feature map FM3 is identical to the number of channels of the second feature map FM2. According to an embodiment of the inventive concept, an operation rate of a sampling layer is higher than that of a pooling layer, and a sampling layer may improve the quality of the output image, such as a peak signal to a noise ratio (PSNR)). For example, as the pooling layer calculates a maximum value or an average value, which may take longer than the operation by the sampling layer.

According to an embodiment, the second layer L2 is not limited to a sampling layer or a pooling layer. That is, the second layer L2 may be a convolution layer similar to the first layer L1. The second layer L2 can generate the third feature map FM3 by convolving the second feature map FM2 with a weight map. In this case, the weight map used by the second layer L2 differs from the weight map WM used by the first layer L1.

According to an embodiment, after a plurality of layers that include the first layer L1 and the second layer L2, an $N^{th}$ feature map is generated in an Nth layer. The $N^{th}$ feature map is input to a reconstruction layer at a back end of the neural network NN from which the output data is output. The reconstruction layer generates the output image based on the Nth feature map. In addition, the reconstruction layers receives a plurality of feature maps, such as the first feature map FM1 and the second feature map FM2, as well as the Nth feature map, and generates the output image based on the plurality of feature maps.

According to an embodiment, the third layer L3 generates a feature vector (FV). The generated FV can be used to determine classes CL of the input data by combining features of the third feature map FM3. In addition, the third layer L3 generates a recognition signal REC that corresponds to a class. For example, the input data may be still image data or a video frame. In this case, the third layer L3 extracts a class that corresponds to an object in the image represented by the input data based on the third feature map FM3, thereby recognizing the object and generating the recognition signal REC that corresponds to the recognized object.

Figure 3A:
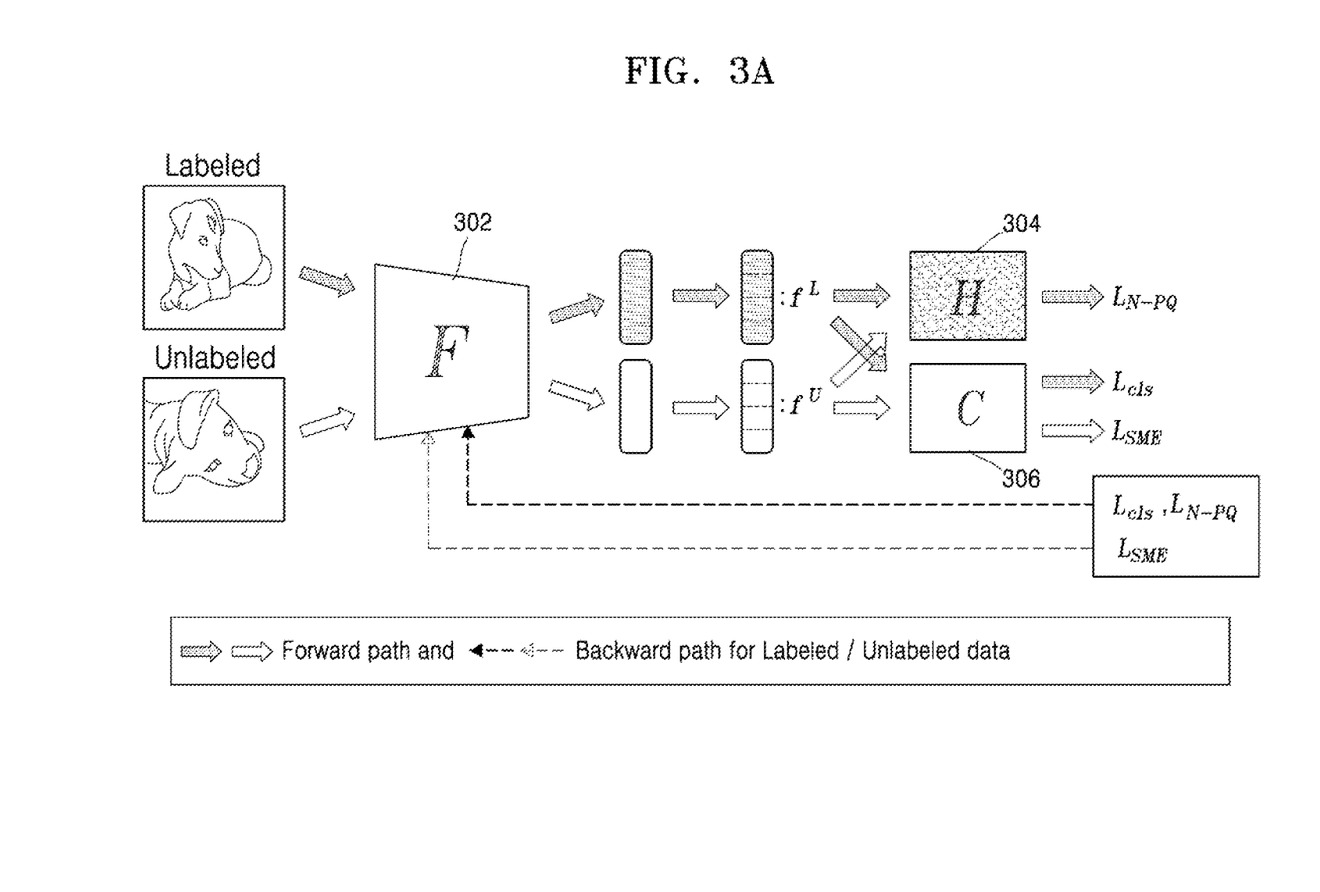
FIG. 3A shows a neural network device according to an embodiment of the inventive concept.

FIG. 3A shows a neural network device according to an embodiment of the inventive concept.

Referring to FIG. 3A, according to an embodiment, the feature extraction module 302 extracts a compact feature vector by using an image that is the input data. The feature vector is used for training the neural network. The neural network learns optimal codewords for classification based on feature vectors of the labeled image and the unlabeled image, and may use a codebook, which is a group of the learned codewords, for retrieving a query image. Feature vectors extracted from similar images have short distances from one another.

According to various embodiments, an objective function $\mathcal{L}_T(B)$ used in a convolutional neural network shown in FIG. 3A is as follows:

Equation 1:

$$\mathcal{L}_T(B) = \mathcal{L}_{N\text{-}PQ} + \frac{1}{B}\sum_{b=1}^{B}(\lambda_1 \mathcal{L}_{cls} - \lambda_2 \mathcal{L}_{SEM})$$

Here, $\mathcal{L}_{N\text{-}PQ}$ is an objective function for an N-pair product quantization and corresponds to an objective function that changes from a metric learning-based objective function to one suitable for image retrieving, $\mathcal{L}_{cis}$ corresponds to an objective function for the labeled image, and $\mathcal{L}_{SEM}$ corresponds to an objective function for the unlabeled image. B corresponds to the number of learning images, and $\lambda_1$, $\lambda_2$ respectively refer to learning weights for the labeled image and the unlabeled image. The relative values of the learning weights indicate which of the labeled and unlabeled images are more favored in the learning process. For example, even when the neural network learns by using both the unlabeled image and the labeled image, the neural network device 10 may set the learning to be more influenced by the labeled image by setting $\lambda_1$ to be greater than $\lambda_2$. For example, for $\lambda_2$ greater than $\lambda_1$, the neural network device 10 performs a small amount of optimal codeword learning for the prototype vector by using the labeled image and performs a large amount of optimal codeword learning by using the unlabeled image.

According to various embodiments, the neural network device 10 performs learning of the neural network to generate a database for retrieving images. The neural network receives the labeled image and the unlabeled image as the input images. The feature extraction module 302 extracts a feature vector for each of the labeled image and the unlabeled image. Hereinafter, for convenience of description, the feature vector for the labeled image will be referred to as a labeled feature vector, and the feature vector for the unlabeled image will be referred to as an unlabeled feature vector.

According to various embodiments, the neural network perform intra normalization for each of the labeled feature vector and the unlabeled feature vector. Each of the labeled feature vector and the unlabeled feature vector is divided into a plurality of sub vectors according to the intra normalization.

Figure 3B:
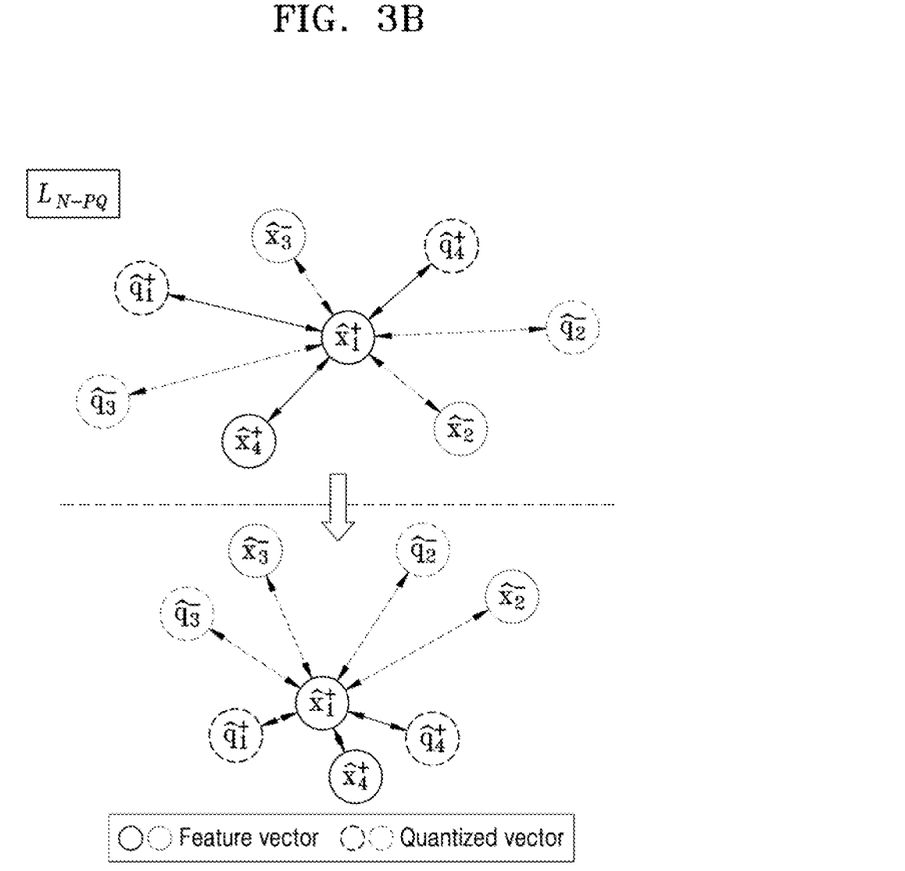
FIG. 3B shows an example of a result of preforming product quantization in a feature space according to an embodiment of the inventive concept.
Figure 3C:
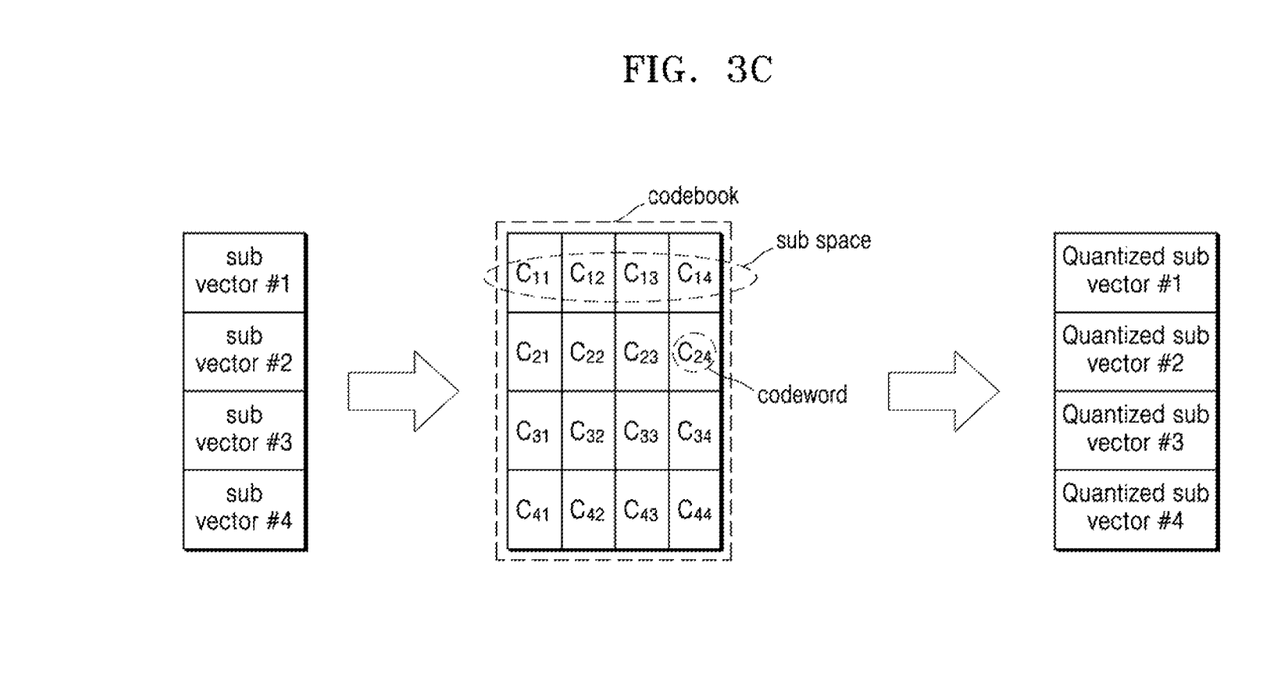
FIG. 3C shows a relationship among sub vectors, a codebook, and quantized sub vectors according to an embodiment of the inventive concept.

FIG. 3B shows an example of a result of performing product quantization in a feature space according to an embodiment of the inventive concept; and FIG. 3C shows a relationship among sub vectors, a codebook, and quantized sub vectors according to an embodiment of the inventive concept.

Referring to FIG. 3B, according to various embodiments, circles formed from solid lines correspond to feature vectors, and circles formed from broken lines correspond to quantized vectors. According to various embodiments, a hash table in FIG. 1 receives $f^L$ and $f^U$ as inputs and classifies $f^L$ and $f^U$ to easily distinguish a class of the image. The $f^L$ and $f^U$ denote feature vectors based on the labeled image and the unlabeled image respectively.

According to various embodiments, before the hash table 304 performs product quantization, the feature vectors are not arranged in the feature space such that feature vectors in a same class are close to one another. An upper image in FIG. 3B represents the feature space before product quantization is performed. $x_1^+$, $x_4^+$, $q_4^+$, and $q_1^+$ constitute a first class, and $x_2^-$, $q_2^-$, $x_3^-$, and $q_3^-$ constitute a second class. Referring to FIG. 3B, by performing product quantization using the hash table 304, quantized feature vectors in the first class and the second class can be arranged to be close to one another.

Referring to FIG. 3A and FIG. 3B, the hash table 304 performs learning for product quantization based on the following equation.

Equation 2:

$$\mathcal{L}_{N\text{-}PQ} = \frac{1}{B}\sum_{b=1}^{B} \mathcal{L}_{CE}(S_b, Y_b)$$

Here, $\mathcal{L}_{CE}$ is an objective function for a cross entropy, $S_b$ is a cosine similarity between a $b^{th}$ feature vector and all quantization vectors, and $Y_b$ is a similarity between a $b^{th}$ label and all labels in a batch.

Referring to FIG. 3A and FIG. 3C, according to various embodiments, first through fourth sub vectors are shown on the left. The sub vectors result from dividing a k-dimensional feature vector received by the neural network device 10 and extracted by the feature extraction module 302 at regular intervals.

According to various embodiments, the first through fourth quantized sub vectors $q_m$ are calculated according to the following equation.

Equation 3:

$$q_m = \sum_{k}^{K} \frac{e^{-\alpha(x_m \cdot z_{mk})}}{\sum_{k'}^{K} e^{-\alpha(x_m \cdot z_{mk'})}} z_{mk}$$

Here, $x_m$ corresponds to an $m^{th}$ sub vector, and $z_{mk}$ corresponds to a $k^{th}$ codeword in an $m^{th}$ sub space in the codebook. From Equation 3, it is found that the quantized sub vector is calculated based on a cosine similarity between the sub vector and codewords of a sub space that correspond to the sub vector. In other words, the quantized sub vector is quantized by reflecting a large number of codewords having similar characteristics and reflecting a small number of codewords having different data characteristics of a plurality of codewords of a corresponding sub space. For example, referring to FIG. 3C, a first quantized sub vector #1 is obtained by calculating a cosine similarity between the first sub vector #1 and a plurality of codewords $C_{11}$, $C_{12}$, $C_{13}$, and $C_{14}$ in a first sub space that correspond to the first sub vector #1.

According to various embodiments, the hash table 304 obtains binary hash codes for all of the feature vectors by replacing or representing the sub vectors with a binary index value that represents a codeword that has a shortest distance of the codewords in a sub space that corresponds to each of the divided sub vectors. For example, referring to FIG. 3C, the first through fourth sub vectors respectively have high cosine similarities with $C_{11}$, $C_{24}$, $C_{32}$, and $C_{43}$ of codewords in corresponding sub spaces. In this case, the hash table 304 stores a binary value that represents a codeword of the sub spaces that has a highest cosine similarity, instead of storing real number values of the first through fourth quantized feature vectors. For example, the hash table 304 stores the feature vector as (00, 11, 01, 10).

Figure 3D:
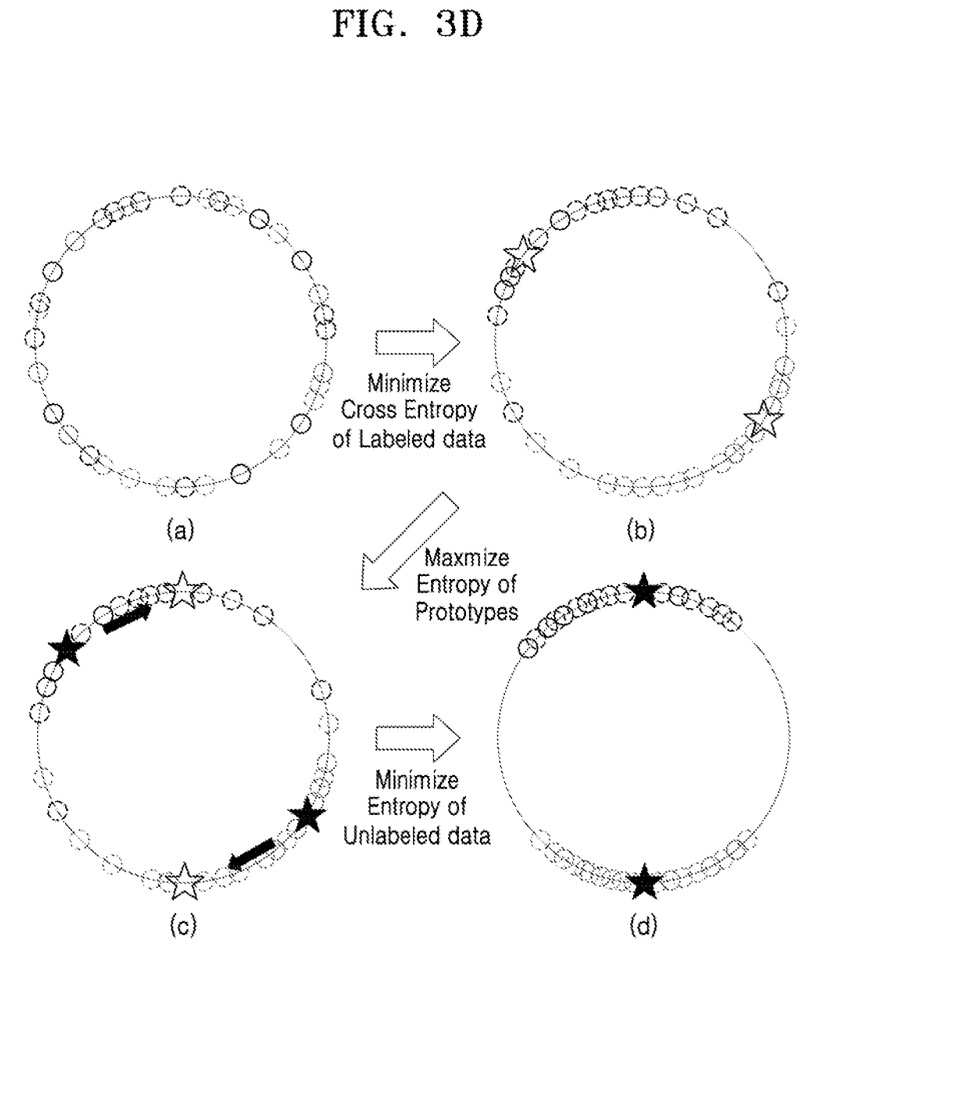
FIG. 3D shows an example of a learning process that uses a classifier, according to embodiments of the inventive concept.

FIG. 3D shows an example of a learning process that uses a classifier, according to embodiments of the inventive concept.

Referring to FIG. 3A and FIG. 3D, according to various embodiments, the classifier 306 performs learning of the neural network with respect to each of the labeled image and the unlabeled image.

According to various embodiments, the classifier 306 performs learning with respect to the neural network by classifying labels with respect to the labeled image based on the following objective function.

Equation 4:

$$\mathcal{L}_{cls} = \frac{1}{M}\sum_{m=1}^{M} \mathcal{L}_{CE}(\beta \cdot p_m^L, y)$$

Here, $\beta$ is a scaling factor, y is a label in which the feature vector of the labeled image is included, and $p_m^L = W_m^T x_m^L$ represents a probability that the labeled image belongs to a certain class. The classifier 306 obtains a sub prototype vector by learning codewords using labeled images corresponding to classes. Referring to (a) and (b) in FIG. 3D, the classifier 306 learns codewords that minimize a cross entropy for the labeled images using Equation 4. Accordingly, sub vectors of the labeled image in (a) are arranged to have a high entropy on a two-dimensional hypersphere manifold, but sub vectors of the labeled image in (b) are rearranged such that the first class are close to each other and the second class are close to each other, based on the sub prototype vector.

Referring to (c) and (d) in FIG. 3D, according to various embodiments, the classifier 306 performs learning with respect to the neural network based on feature vectors of the unlabeled images, based on the following objective function.

Equation 5:

$$\mathcal{L}_{SEM} = -\frac{1}{M}\sum_{m=1}^{M}\sum_{l=1}^{N^c} (\beta \cdot p_{ml}^U)\log(\beta \cdot p_{ml}^U)$$

Here, $P^U$ is a probability that the labeled image belongs to a certain class, and thus is derived for all M sub vectors and is calculated for $N_c$ labels. In addition, $\beta$ is the scaling factor.

That is, according to various embodiments, the classifier 306 adjusts the sub prototype vectors such that an entropy of the sub prototype vectors is maximized for the sub vectors of the unlabeled images distributed on the manifold, and learns the codewords that minimize the entropy of the unlabeled images distributed in the subspace based on rearranged sub prototype vectors.

Figure 4:
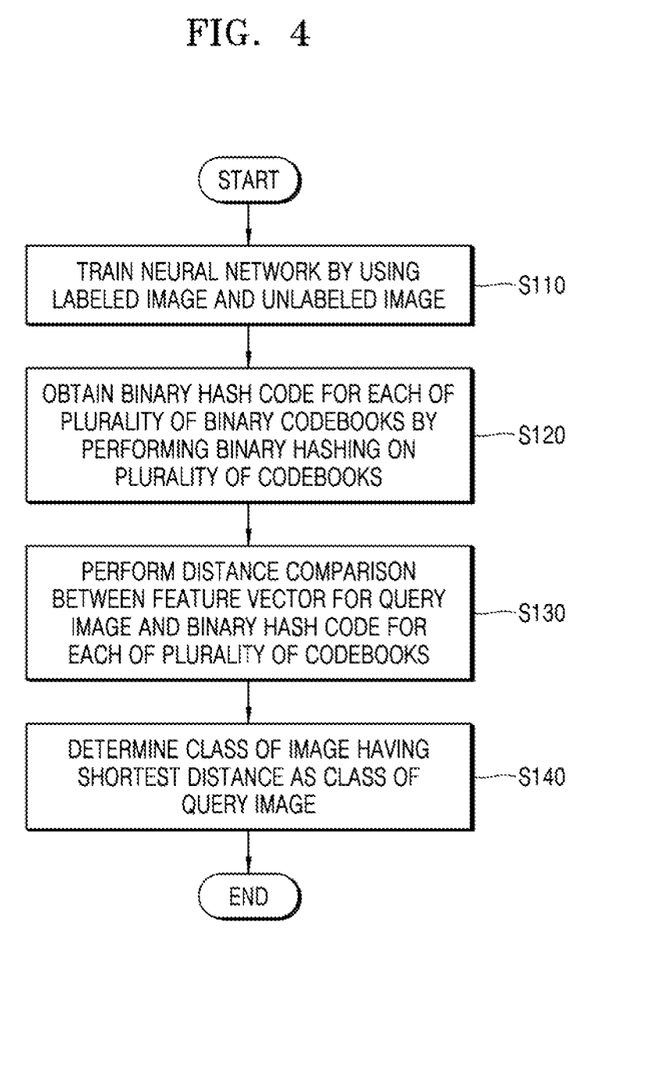
FIG. 4 is a flowchart of an operation of a neural network device according to an embodiment of the inventive concept.

FIG. 4 is a flowchart of an operation of the neural network device 10 according to an embodiment of the inventive concept.

Referring to FIG. 4, according to various embodiments, in operation S110, the neural network device 10 trains the neural network by using the labeled image and the unlabeled image. In detail, the neural network device 10 constructs an optimal codebook for image retrieval of the neural network device 10 by learning the codewords that minimize the cross entropy of the feature vectors of the labeled images and determine the sub prototype vector, changing the determined sub prototype vector by learning codewords that maximize the entropy of the sub prototype vector, and learning codewords that minimize the entropy of the unlabeled feature vectors based on the changed sub prototype vectors. Details of operation S110 will be described below with reference to FIG. 5.

In operation S120, according to various embodiments, the neural network device 10 obtains a binary hash code by performing binary hashing with respect to a plurality of codebooks. The binary hash code is obtained by replacing the feature vector with a binary value that represents a codeword that has a highest cosine similarity with each of the sub vectors of the codewords in the sub space.

In operation S130, according to various embodiments, the neural network device 10 performs a distance comparison between a feature vector for the query image and the binary hash code. The neural network device 10 extracts the feature vector for retrieving images. The neural network device 10 extract the feature vector for a received query image by using the feature extraction module 302. The neural network device 10 generates look-up tables that store distance difference values between the plurality of code books generated during a training phase and the feature vector for the extracted query image. Sizes of the look-up tables are identical to a size of the codebook. Thereafter, the neural network device 10 sums values represented by the binary hash codes in each sub space for each of the generated look-up tables and calculates a distance between the query image and each of the training images. For example, when the neural network device 10 is trained using five hundred images, five hundred codebooks are generated and stored. The neural network device 10 generates look-up tables that include distance difference values between the feature vector and the five hundred codebooks, and only extracts and add values represented by the binary hash code that correspond to each of the codebooks, thereby obtaining distances between the query image and the five hundred training images.

In operation S140, according to various embodiments, the neural network device 10 determines a class of an image that has a shortest distance of result values calculated in operation S130 as the class of the query image. The training image with the shortest distance includes characteristics most similar to those of the query image, and therefore, the neural network device 10 retrieves and classifies the query image by determining a class that corresponds to the training image with the shortest distance to a class of the query image.

Figure 5:
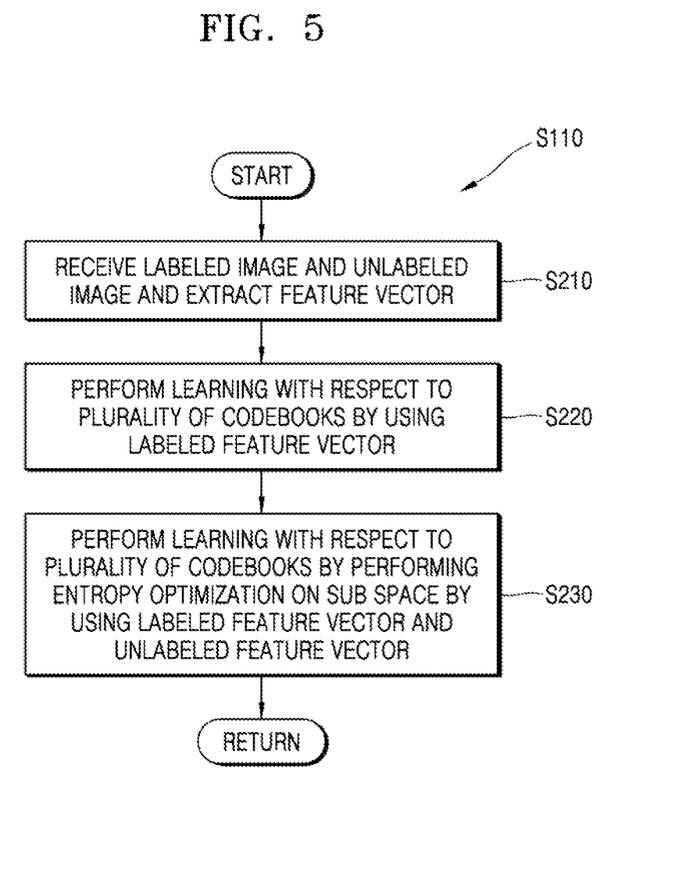
FIG. 5 is a flowchart of learning procedure of a neural network according to embodiments of the inventive concept, in which operation S110 in FIG. 4 is shown in detail.

FIG. 5 is a flowchart of a learning procedure of a neural network according to embodiments of the inventive concept, in which operation S110 in FIG. 4 is shown in detail.

Referring to FIG. 5, according to various embodiments, in operation S210, the neural network device 10 receives the labeled image and the unlabeled image and extracts the feature vector. The labeled image and the unlabeled image are all included in the training image. The feature extraction module 302 of the neural network device 10 obtains labeled feature vectors and unlabeled feature vectors, from the received labeled image and unlabeled image.

In operation S220, according to various embodiments, the neural network device 10 performs learning with respect to the plurality of codebooks by using the labeled feature vector. That is, the neural network device 10 learns a codebook using feature vectors of the labeled images. To obtain codewords that minimize cross-entropy between the label feature vectors, the neural network device 10 learns codewords through back propagation. When the feature vector of the labeled image is quantized using the learned codebook, the quantized labeled feature vector can be closely arranged on a two-dimensional manifold.

In operation S230, according to various embodiments, the neural network device 10 performs learning on the plurality of codebooks by performing entropy optimization on the sub spaces using the labeled feature vector and the unlabeled feature vectors. The entropy optimization on the sub spaces is achieved by performing both entropy maximization of the sub prototype vector and entropy minimization of the unlabeled feature vectors. That is, the neural network device 10 performs entropy maximization of the sub prototype vector by changing the sub prototype vector value obtained in operation S220 based on the unlabeled feature vectors, and learns the plurality of codebooks to minimize the entropy of the unlabeled feature vectors on the manifold of the sub space. Details thereof will be described later with reference to FIG. 6.

Figure 6:
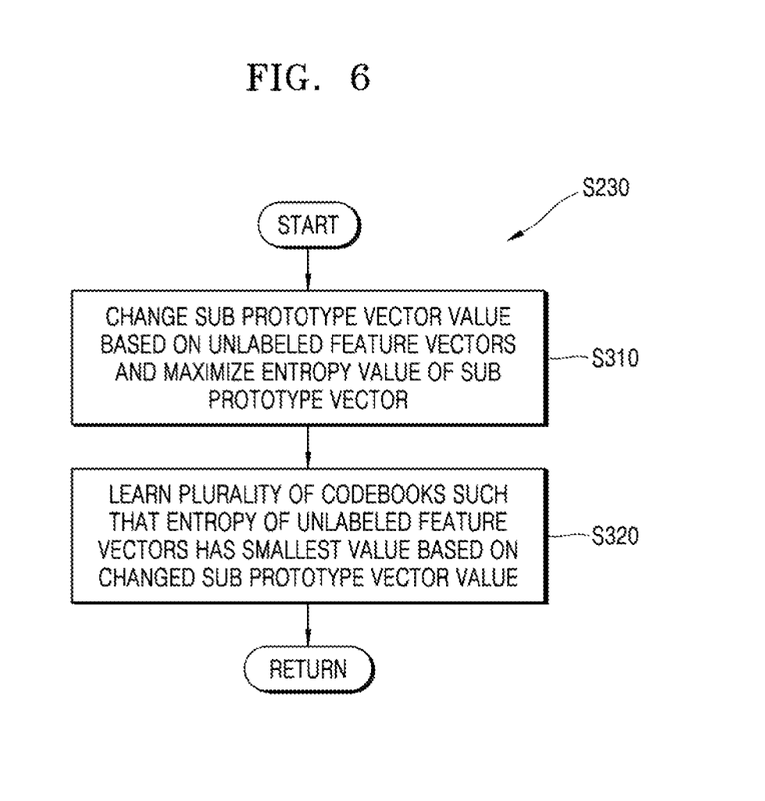
FIG. 6 is a flowchart of entropy optimization of a sub space according to embodiments of the inventive concept, in which operation S230 in FIG. 5 is shown in detail.

FIG. 6 is a flowchart of entropy optimization of a sub space according to embodiments of the inventive concept, in which operation S230 in FIG. 5 is shown in detail.

Referring to FIG. 6, according to various embodiments, in operation S310, the neural network device 10 maximizes an entropy value of the sub prototype vector by changing a value of the sub prototype vector, based on the unlabeled feature vectors. As shown in FIG. 5, the neural network device 10 determines a sub prototype vector for each sub space based on values of the label feature vectors. The determined sub prototype vector corresponds to the sub prototype vector shown in (b) of FIG. 3D. In one embodiment, the sub prototype vector is determined based on one of an average value, a median value, and a mode value of the labeled feature vectors. The neural network device 10 maximizes an entropy of the sub prototype vector by changing the value of the sub prototype vector using the unlabeled feature vectors distributed in the sub spaces. That is, the sub prototype vector is shifted to a region on the manifold in which a plurality of unlabeled feature vectors are distributed.

In operation S320, according to various embodiments, the neural network device 10 learns the plurality of codebooks to minimize the entropy of the unlabeled feature vectors based on the changed sub prototype vector value. In other words, the neural network device 10 learns the plurality of codebooks to be adjacent to the adjusted sub prototype vector on the manifold. In other words, when the feature vectors of the unlabeled images are quantized using the codebooks before learning, the feature vectors are separated from labeled feature vectors in similar classes on the manifold. However, when the feature vectors of the unlabeled image are quantized using the learned codebooks, the feature vectors are moved closer to labeled feature vectors in similar classes on the manifold.

Figure 7:
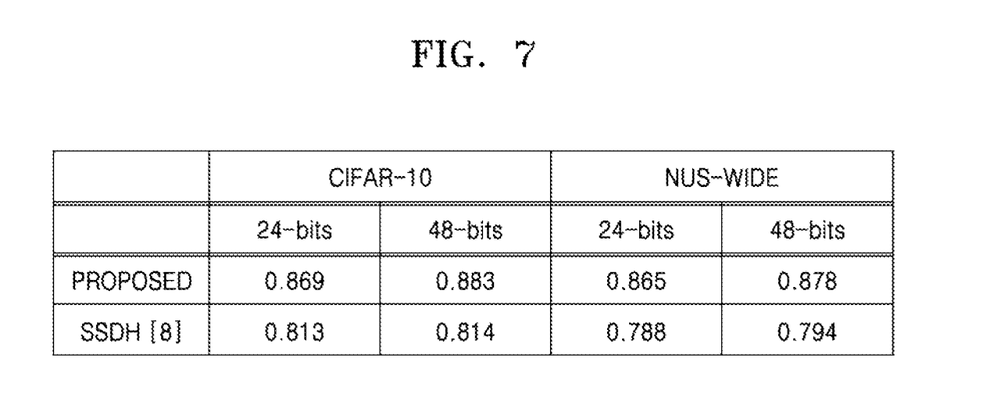
FIG. 7 shows an improved image retrieving result according to embodiments of the inventive concept.

FIG. 7 shows an improved image retrieving result according to embodiments of the inventive concept.

FIG. 7 shows a comparison result of the image retrieving performance of the neural network of the inventive concept and a semi-supervised deep hashing (SSDH) neural network. CIFAR-10 and NUS-WIDE respectively correspond to data sets for the benchmark of image retrieving. In both of the CIFAR-10 data set and the NUS-WIDE data set, it is found that a mean average precision (mAP) value of a neural network according to embodiments of the inventive concept is greater than an mAP value of a neural network based on SSDH.

According to various embodiments, when a neural network according to the inventive concept is used, it is found that an entire image retrieval performance is improved by using the unlabeled images. In addition, in a neural network that is not based on product quantization, improvement in image retrieval performance is expected only by adding the classifier 306. In a neural network that does not retrieve image but performs image classification and identification, the objective function in Equation 5 can be additionally used to improve the robustness of the network for the unlabeled images.

Figure 8:
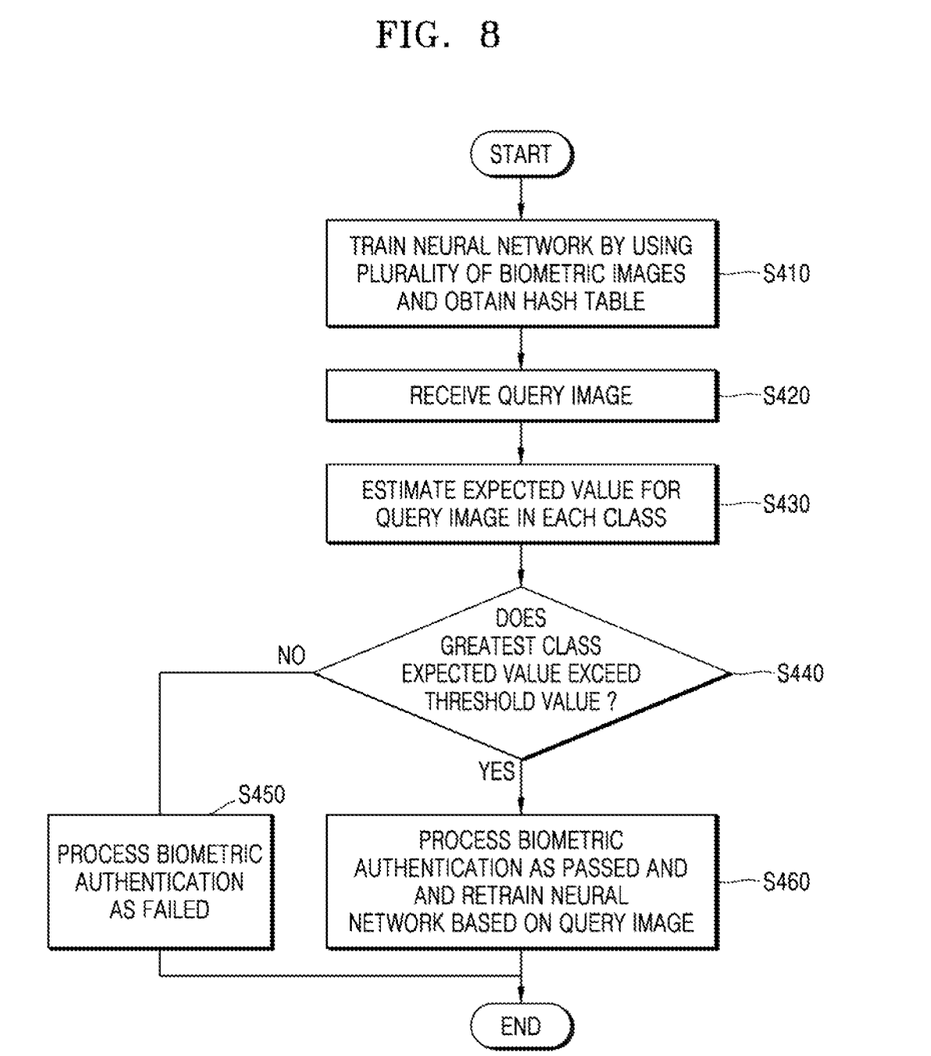
FIG. 8 is a flowchart of a neural network operation according to an embodiment of the inventive concept.

FIG. 8 is a flowchart of operations of the neural network device 10 according to an embodiment of the inventive concept.

Referring to FIG. 8, according to various embodiments, in operation S410, the neural network device 10 trains the neural network and obtains a hash table by using a plurality of biometric images. Here, the plurality of biometric images are used to identify or verify individuals based on human physical characteristics. For example, the plurality of biometric images may include fingerprint images, iris images, vein images, facial images, etc. Hereinafter, for convenience of description, the plurality of biometric images will be assumed to be facial images, however, embodiments are not limited thereto. For example, the neural network device 10 trains the neural network by using five sheets of facial images for each of ten people who can pass through the biometric security. In an embodiment, the neural network device 10 maps information regarding which of the ten people who can pass the biometric security to each of the plurality of biometric images and learns the mapped information. That is, the plurality of biometric images all correspond to the labeled images. In another embodiment, to prevent biasing the labeled images and maintain robustness in more circumstances, the neural network device 10 selects at least one of five hundred images to be an unlabeled image without the mapping information.

According to various embodiments, by using a plurality of biometric images, the neural network device 10 learns five hundred codebooks such that feature vectors of similar images are arranged adjacent to one another in each of the plurality of classes. For example, the plurality of classes may be ten classes that correspond to ten people who pass the biometric authentication.

In operation S420, according to various embodiments, the neural network device 10 receives a query image. The neural network device 10 uses the camera 400 in FIG. 1 to obtain a face image of a person who requires biometric authentication. The neural network device 10 receives the obtained facial image as the query image.

In operation S430, according to various embodiments, the neural network device 10 calculates an expected value for the query image for each class. The neural network device 10 extracts a feature vector of the query image using the feature extraction module 302, and determines the similarity between the extracted feature vector and the plurality of biometric images. For example, the neural network device 10 generates a plurality of look-up tables by subtracting the feature vector from the plurality of codebooks, loading binary hash codes that respectively correspond to the plurality of codebooks and then extracting and summing values that correspond to the binary hash codes for all sub spaces in the codebooks in the look-up table, thereby calculating a distance between the query image and a certain image.

In an embodiment, the neural network device 10 increases a class expected value of the certain image only when the calculated distance between the query image and the certain image is greater than a threshold distance. That is, the neural network device 10 increases a class expected value only when it is determined that the query image and the certain image have a similarity that is equal to or greater than a certain magnitude. Accordingly, in a neural network that has inferior image retrieval performance and classification due to a small number of training images, one query image may increase each of at least two or more class expected values.

In operation S440, according to various embodiments, the neural network device 10 identifies a class that has a greatest value, and determines whether an expected value of the identified class exceeds a threshold value. Examples of expected values measured by comparing distances between the query image and the plurality of biometric images may as follows:

TABLE 1

| | class | expected value |
|---|---|---|
| 1 | Kim xx | 1 |
| 2 | Lee xx | 8 |
| ... | ... | |
| 10 | Shin xx | 2 |

Referring to Table 1, according to various embodiments, each class corresponds to a certain person. As described above, when it is assumed that ten people may pass through biometric security, there are ten classes. The expected value refers to the number of images that have a greater distance from the query image and are determined to be similar. That is, referring to Table 1, as a result of comparing distances between one query image and the training images, i.e., the five hundred biometric images, it is found that one of the images in the "Kim xx" class is determined to have similarity equal to or greater than the threshold distance with the query image, eight of the images in the "Lee xx" class are determined to have similarity equal to or greater than the threshold distance with the query image, and two of the images in the "Shin xx" class are determined to have similarity equal to or greater than the threshold distance with the query image. The neural network device 10 identifies the class "Lee xx" as having a greatest expected value, and determines whether the expected value of the class exceeds a threshold value.

In operation S450, according to various embodiments, if it is determined that the expected value identified in operation S440 does not exceed the threshold value, the neural network device 10 processes the query image as failed the biometric verification. According to an embodiment, when a biometric security level is very high, the threshold value is also very high. For example, when the threshold value is 9, the expected value of the class "Lee xx" is less than the threshold value, and therefore, the biometric verification is processed as failed and the procedures are terminated.

In operation S460, according to various embodiments, if it is determined that the expected value identified in operation S440 exceeds the threshold value, the neural network device 10 processes the query image as succeeding biometric authentication. That is, the neural network device 10 determines that a person who currently requires biometric authentication is a person in the "Lee xx" class. In addition, the neural network device 10 retrains the neural network by using the query image that succeeded the biometric authentication. The query image received during the biometric authentication is an unlabeled image that does not have information regarding that class to which it belongs. Accordingly, every time a new unlabeled image is received, the neural network device 10 uses the new unlabeled image to learn an optimal codeword for classification, thereby improving the image retrieval performance and classification performance of the neural network.

While embodiments of the inventive concept has been particularly shown and described with reference to disclosed embodiments thereof, it will be understood that various changes in form and details may be made therein without departing from the spirit and scope of the following claims.

What is claimed is:

1. A neural network device, comprising:
a processor that performs an operation of training a neural network;
a feature extraction module that extracts unlabeled feature vectors that corresponds to unlabeled images and labeled feature vectors that correspond to labeled images; and
wherein the processor performs first learning with respect to a plurality of codebooks by using the labeled feature vectors but not the unlabeled feature vectors, and performs second learning with respect to the plurality of codebooks by optimizing an entropy based on all of the labeled feature vectors and the unlabeled feature vectors.

2. The neural network device of claim 1, wherein, in the first learning, the processor calculates a representative value of the label feature vectors, determines a calculated vector as a prototype vector, and learns the plurality of codebooks that correspond to the labeled feature vectors such that the labeled feature vectors are adjacent to the prototype vector.

3. The neural network device of claim 2, wherein the representative value corresponds to one of an average value, a median, or a mode of the labeled feature vectors.

4. The neural network device of claim 2, wherein, in the second learning, the processor maximizes an entropy of prototype vectors by adjusting a value of the prototype vector to be adjacent to the unlabeled feature vectors.

5. The neural network device of claim 4, wherein, in the second learning, the processor learns the plurality of codebooks that corresponds to the unlabeled feature vectors such that the unlabeled feature vectors are adjacent to the adjusted prototype vector.

6. The neural network device of claim 5, wherein the processor generates a hash table that includes a binary hash code for each of the plurality of codebooks, wherein the binary hash code represents a codeword similar to a feature vector.

7. The neural network device of claim 6, wherein the processor receives a query image, extracts a feature vector of the received query image, and stores a difference value between the extracted feature vector and the plurality of codebooks in a look-up table.

8. The neural network device of claim 7, wherein the processor, based on the look-up table and the bash table, calculates distance values between the query image, the unlabeled images, and the labeled images.

9. The neural network device of claim 8, wherein the processor identifies an image that corresponds to a smallest value of the calculated distance values, and wherein the neural network device further comprises a classifier that classifies a class of the identified image as a class of the query image.

10. A method of operating a neural network, the method comprising:
extracting unlabeled feature vectors that correspond to unlabeled images and labeled feature vectors that correspond to labeled images;
performing first learning with respect to a plurality of codebooks by using the labeled feature vectors but not the unlabeled feature vectors; and
performing second learning with respect to the plurality of codebooks by optimizing an entropy based on all of the labeled feature vectors and the unlabeled feature vectors.

11. The method of claim 10, wherein performing the first learning comprises:
calculating a representative value of the labeled feature vectors;
determining the calculated representative value as a value of a prototype vector; and
learning a plurality of codebooks that correspond to the labeled feature vectors such that the labeled feature vectors are adjacent to the prototype vector.

12. The method of claim 11, wherein performing the second learning further includes optimizing an entropy of the prototype vector by adjusting a value of the prototype vector such that the prototype vector is adjacent to the unlabeled feature vectors.

13. The method of claim 12, wherein performing the second learning further includes learning a plurality of codebooks that correspond to the unlabeled feature vectors such that the unlabeled feature vectors correspond to the adjusted prototype vectors.

14. The method of claim 13, further comprising generating a hash table that includes a binary hash code for each of the plurality of code books, wherein the binary hash code represents a codeword similar to a feature vector.

15. The method of claim 14, further comprising:
receiving a query image;
extracting a feature vector of the received query image; and
storing, in a look-up table, a difference value between the extracted feature vector and the plurality of codebooks.

16. The method of claim 15, further comprising calculating distance values between the query image, the unlabeled images, and the labeled images, based on the look-up table and the hash table.

17. The method of claim 16, further comprising:
identifying an image that corresponds to a smallest value of the calculated distance values; and
classifying the identified image as belonging to a class of the query image.

18. A method of operating a neural network, the method comprising:
receiving a plurality of biometric images that include at least one labeled image and at least one unlabeled image;
extracting feature vectors that correspond to the plurality of biometric images;
training a plurality of codebooks by using the feature vectors;

receiving a query image and calculating distance values between the query image and the plurality of biometric images;

estimating, based on the calculated distance values, expected values for classes that classify the plurality of biometric images;

passing a biometric authentication when a greatest value of the expected values exceeds a preset threshold value, and retraining the plurality of codebooks by using the query image, in response to passing the biometric authentication.

19. The method of claim 18, wherein estimating the expected values for the classes that classify the plurality of biometric images based on the calculated distance values further comprises counting a number of images whose calculated distance value exceeds a threshold value.

* * * * *